United States Patent
Lewis et al.

(10) Patent No.: US 9,672,370 B1
(45) Date of Patent: Jun. 6, 2017

(54) SHARING DIGITAL MEDIA WITHIN A SPACE

(71) Applicant: Google Inc., Mountain View, CA (US)

(72) Inventors: Thor Lewis, San Francisco, CA (US); Barbara Petit, Los Altos, CA (US)

(73) Assignee: Google Inc., Mountain View, CA (US)

( * ) Notice: Subject to any disclaimer, the term of this patent is extended or adjusted under 35 U.S.C. 154(b) by 246 days.

(21) Appl. No.: 14/523,632

(22) Filed: Oct. 24, 2014

(51) Int. Cl.
| G06F 21/31 | (2013.01) |
| H04N 21/414 | (2011.01) |
| H04N 21/442 | (2011.01) |
| H04N 21/45 | (2011.01) |
| G06F 21/62 | (2013.01) |

(52) U.S. Cl.
CPC .......... *G06F 21/6209* (2013.01); *G06F 21/31* (2013.01); *H04N 21/41407* (2013.01); *H04N 21/41415* (2013.01); *H04N 21/44218* (2013.01); *H04N 21/4532* (2013.01)

(58) Field of Classification Search
CPC ..... H04L 67/22; H04L 67/24; H04L 12/1822; H04N 21/41407; H04N 21/41415; H04N 21/4532; H04N 21/44218; G06F 21/31
USPC ...................................................... 726/26–30
See application file for complete search history.

(56) References Cited

U.S. PATENT DOCUMENTS

| 8,400,322 B2 | 3/2013 | Acedo et al. |
| 8,612,860 B2 | 12/2013 | Singer et al. |
| 8,732,735 B2 | 5/2014 | Fryer et al. |
| 2005/0195330 A1* | 9/2005 | Zacks ............... H04N 7/147 348/564 |
| 2006/0064643 A1 | 3/2006 | Hariton |
| 2007/0028119 A1* | 2/2007 | Mirho ............... G07C 9/00087 713/189 |
| 2007/0150827 A1* | 6/2007 | Singh ............... G06F 3/011 715/773 |
| 2011/0069940 A1* | 3/2011 | Shimy ............... G11B 27/105 386/296 |
| 2012/0271715 A1* | 10/2012 | Morton ............... G06Q 30/0257 705/14.53 |
| 2013/0036011 A1 | 2/2013 | Roberts et al. |
| 2013/0159499 A1 | 6/2013 | Besehanic |
| 2013/0227595 A1* | 8/2013 | Nielsen ............... H04H 60/45 725/11 |
| 2013/0232515 A1 | 9/2013 | Rivera et al. |
| 2014/0189108 A1 | 7/2014 | Frett et al. |
| 2014/0218515 A1* | 8/2014 | Armendariz ............... G08B 23/00 348/143 |

* cited by examiner

*Primary Examiner* — Tae Kim
(74) *Attorney, Agent, or Firm* — Fish & Richardson P.C.

(57) ABSTRACT

Methods, systems, and apparatus, including computer programs encoded on computer storage media, for sharing digital media with a space. One of the methods includes receiving a request from a first user to provide digital media for presentation in a first physical space, the request identifying the digital media and a group of authorized users allowed to view the digital media. Sensors in the first space identify the authorized users located in the first physical space. That only authorized users can view the digital media is determined from the sensors. The digital media is provided for presentation in the first physical space while determining that only authorized users can view the digital media.

17 Claims, 4 Drawing Sheets

SHARING DIGITAL MEDIA WITHIN A SPACE

BACKGROUND

This specification relates to media presentation. Digital media, e.g., presentations, documents, movies, are often presented by businesspeople to coworkers or potential clients. For instance, a businessperson can create a presentation regarding a business opportunity, and project the presentation on a screen for coworkers to view. The businessperson can store digital media on a personal hard drive or flash drive, or can store the digital media in an online server. The online server can be associated with a cloud storage provider, which the businessperson can access to download digital media and provide for presentation to coworkers.

SUMMARY

In general, one innovative aspect of the subject matter described in this specification can be embodied in methods that include the actions of receiving a request from a first user to provide digital media for presentation in a first physical space, the request identifying the digital media and a group of authorized users allowed to view the digital media; identifying, from a plurality of sensors in the first space, one or more of the authorized users located in the first physical space; determining, from the plurality of sensors in the first physical space, that only authorized users can view the digital media; and while determining that only authorized users can view the digital media, providing the digital media for presentation in the first space.

The foregoing and other embodiments can each optionally include one or more of the following features, alone or in combination. Determining that only authorized users can view the digital media comprises determining that a probability that only authorized users can view the digital media is greater than a threshold value. The actions include determining, from the plurality of sensors in the first space, that the probability that only authorized users can view the digital media is below the first threshold; and stopping providing the digital media for presentation in at least a portion of the first space. Determining that the probability is below the first threshold value comprises: identifying, from the plurality of sensors, a non-authorized user; and determining, from the plurality of sensors, that a gaze of the non-authorized user is in line of sight with the digital media provided for presentation. The actions include determining, from the plurality of sensors, that the non-authorized user is within a particular number of feet from the digital media provided for presentation, wherein the particular number of feet is determined from dimensions of the digital media provided for presentation. Determining that the probability is below the first threshold value comprises: identifying, from the plurality of sensors, a non-authorized user; and determining that the non-authorized user is turning to be in line of sight with the digital media provided for presentation. Determining that the non-authorized user is turning comprises: obtaining, from the plurality of sensors, a skeleton reconstruction of the non-authorized user; and determining, from the skeleton reconstruction, that the non-authorized user is turning to be in line of sight with the digital media provided for presentation. Identifying an authorized user comprises: obtaining one or more images of the authorized user identified by the request; obtaining information from the plurality of sensors describing one or more humans in the first space; and determining, from the one or more images, that the authorized user is a human of the one or more humans. The request specifies identifiers of beacons to be worn by the authorized users, and wherein identifying an authorized user comprises: obtaining information from the plurality of sensors describing one or more identifiers of respective beacons worn by respective humans in the first space; identifying, from the information, an identifier of a beacon to be worn by the authorized user that is worn by a human in the first space; and designating the human as the authorized user. The plurality of sensors comprise one or more of thermal sensors, cameras, wireless communication sensors, and/or ultrasonic sensors. The request further identifies a second space for the presentation of the digital media. The request identifies two or more presentation devices in the first space that are to present the digital media.

Particular embodiments of the subject matter described in this specification can be implemented so as to realize one or more of the following advantages. Digital media can be provided in a public or semi-private room with strict control over authorized people that can view the digital media. Privacy of the digital media can be maintained even in a public room with hundreds of people walking around. Anytime a non-authorized person is about to glance at the digital media, the digital media can be temporarily turned off, preserving privacy.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes techniques for presenting media in a public or semi-private space, and only allowing particular authorized users to view the presented digital media. A user can specify the authorized users when providing a request to a system to present digital media in a particular space. The system can identify humans in the space that correspond to authorized users, and humans in the space that do not correspond to authorized users. In some implementations the system can obtain images of authorized users for use in identifying the authorized users in the space, or, in some other implementations, each authorized user can wear a beacon that identifies to the system that they are an authorized user.

The system can also determine that a non-authorized user is about to, or is, viewing the digital media. To effect this determination, the system can obtain sensor data from sensors, e.g., infra-red spectra cameras, visible spectra cameras, stereo cameras, depth cameras, ultra-sonic sensors, audio sensors, wireless communication sensors, positioned in and around the space, and determine the gaze, e.g., the visual field of view, of each non-authorized user that can be identified by the system. The system can also determine that a non-authorized user is about to view the digital media, e.g., by turning around. The system can use skeletal reconstruction to determine a direction or rotation of travel of the non-authorized user. In this way the system can determine when a non-authorized user is, or is about to be, in line of sight with the digital media.

If the system determines that a non-authorized user is about to view, or is viewing, the digital media, the system can stop the presentation of the digital media in the location where the non-authorized user is viewing, or is about to view. In some implementations the user can specify one or more presentation devices, e.g., a device that presents the digital media, in the space, and the system can determine whether a non-authorized user is viewing, or is about to view, any of the presentation devices. Upon a positive determination, the system can stop providing the digital media for presentation on the particular presentation device being viewed, or about to be viewed, while the remaining presentation devices can continue presenting the digital media.

The system can then resume presentation of the digital media upon determining that no non-authorized users are positioned to view the digital media.

Figure 1:
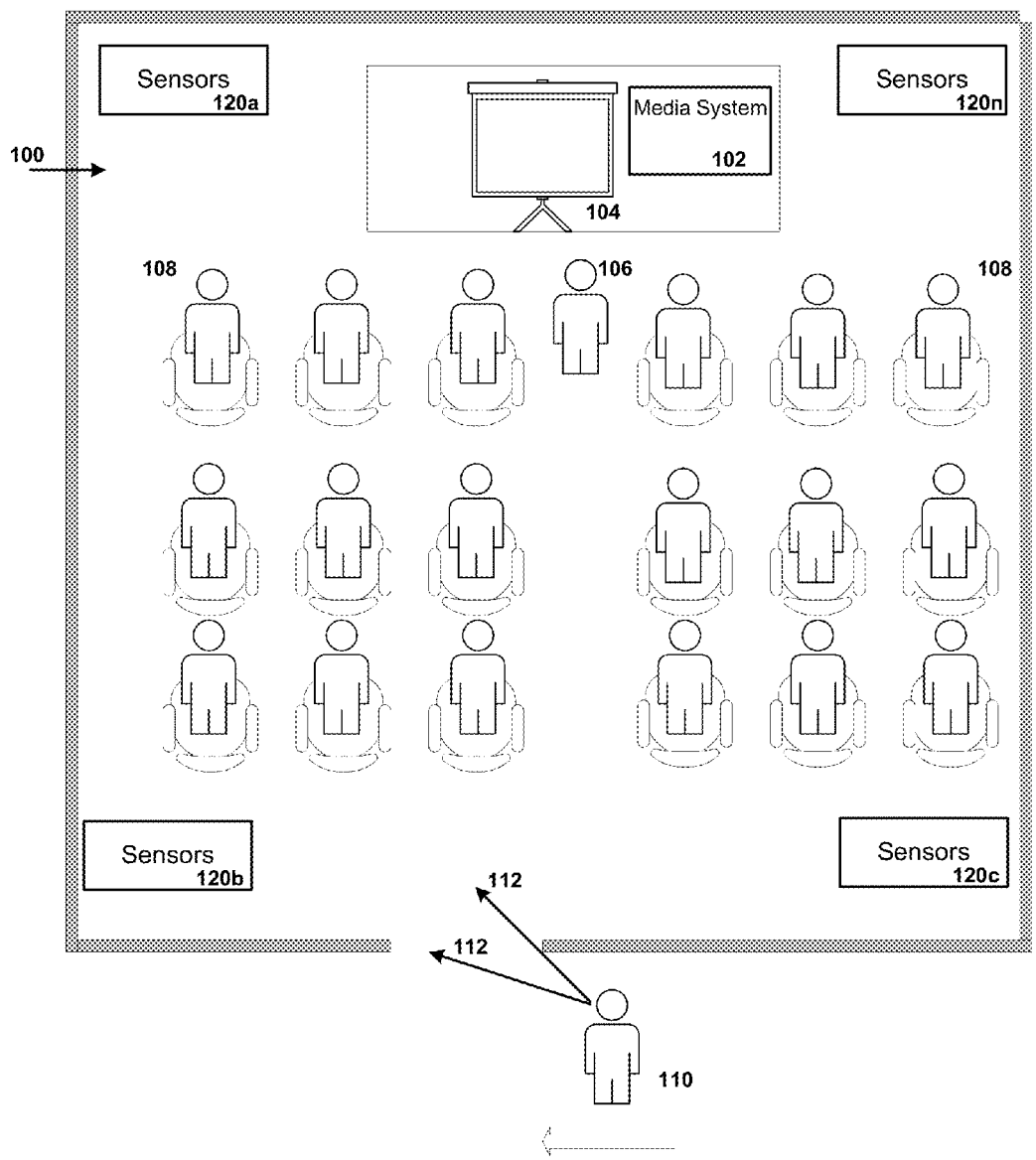
FIG. 1 illustrates a diagram of an example space for the presentation of digital media.

FIG. 1 illustrates a diagram of an example space 100 for the presentation of digital media. The space 100 includes a presentation device 104, e.g., a monitor, a projector screen, a laptop screen, a tablet, and so on, configured to present digital media, e.g., documents, presentations, movies, pictures, spreadsheets, and a media system 102 that receives information from a presenting user 106 specifying the digital media to present. In some implementations the media system 102 can be software executing on a system of one or more computers, e.g., a server system, that can communicate with the sensors 120a-n. In these implementations, the media system 102 can communicate with the sensors 120a-n over a network, e.g., the Internet, a local area network, and need not be located in the space 100. The space 100 further includes authorized users 108, i.e., humans, that are identified to the media system 102 as being allowed to view the digital media. Sensors, e.g., sensors 120a-n, are positioned in the space 100 to identify humans that correspond to the authorized users 108, and humans that are non-authorized, e.g., the non-authorized user 110.

The presenting user 106 can provide a request to the media system 102, e.g., using a user device, that identifies the digital media to be provided and one or more identifiers of the authorized users 108. Additionally, in some implementations, the request identifies one or more spaces, e.g., the space 100, and one or more presentation devices in the one or more spaces to present the digital media. Providing a request is described below, with reference to FIG. 3.

In some implementations, the media system 102 is in communication with, or a part of, a digital media server that stores digital media associated with a user account of the presenting user 106. To identify digital media to the media system 102, the presenting user 106 can access a list of digital media stored on the digital media server system, and select from among the list. The digital media server can then transfer the digital media to the media system 102, or provide a reference to a file location of the digital media.

In some other implementations, the presenting user 106 can directly provide the digital media to the media system 102, e.g., as an upload to the media system 102, or can use a local area network to specify a location of the digital media that is stored on a server associated with the local area network.

The presenting user 106 can also provide identifications of each authorized user to the media system 102. For instance, the presenting user 106 can provide user names of respective user accounts associated with the media system 102. Additionally, the presenting user 106 can provide names of the authorized users 108, and the media system 102 can identify stored information associated with each of the names, e.g., user account name.

In some implementations, the presenting user 106 can identify the authorized users 108 from a contacts list, e.g., an address book, of the presenting user 106. For instance, the presenting user 106 can create a calendar event for a presentation of the digital media, and identify authorized users 108 as the recipients of the calendar event. The media system 102 can identify the authorized users from this calendar event.

After the media system 102 receives identifications of the authorized users 108, the media system can obtain information describing each authorized user. Information describing an authorized user is information that allows for the media system 102 to identify a human in the space 100 that corresponds to the authorized user. In some implementations, the media system 102 receives, or stores, information describing potential authorized users. For instance, the media system 102 can receive, or store, images of users, e.g., facial images, body images, and so on, and the media system 102 can obtain the images for each identified authorized user.

In some implementations, the media system 102 can receive, or assign, identifications for individual beacons, e.g., wearable devices that broadcast a unique identifier over a communications protocol, to be worn by each authorized user. Each beacon worn by an authorized user can be associated with a respective identifier, and the media system 102 can identify a human in the space 100 as an authorized user based on a respective beacon identifier. A beacon identifier can be, for example, a value provided over a wireless transmission, e.g., a BLUETOOTH transmission, a near field communication transmission, and the media system 102 can triangulate the location of authorized users in the space 100 using wireless receivers in the space 100.

The media system 102 can then obtain sensor data from the sensors 120a-n in the space 100 and begin identifying humans in the space 100.

In implementations where the media system 102 has access to images of authorized users 108, the media system 102 can obtain sensor information, e.g., from sensors 120a-n, and identify humans in the room. For instance, the media system 102 can obtain video from cameras included in the sensors 120a-n and perform a computer vision process to identify humans. After identifying humans, the media system 102 can perform a facial recognition process to identify faces of humans identified in the room that correspond to authorized users 108. For example, the media system 102 can have machine learning models stored that can perform facial recognition processes on humans in the space 100. The facial recognition process can obtain images, e.g., from sensors 120a-n, of the space, and perform a 2D or 3D alignment process on the obtained images. After the alignment process, the media system 102 can process the obtained images according to rules identified from stored machine learning models trained on images of the authorized users 108, and determine labels, e.g., names, user account names, for human in the space 100.

Additionally, in implementations where humans in the space 100 wear beacons, the media system 102 can obtain sensor information identifying locations of beacons in the space 100. The media system 108 can then identify locations of humans in the space 100, and determine whether a human wearing a particular beacon is an authorized user. The media system 108 can determine that a human is not an authorized user by identifying the location of the human as not corresponding to the location of the beacon.

Upon determining that only authorized users 108 are in the space or are within a field of view for viewing the digital media, the media system 102 can provide the digital media for presentation in the space 100.

The media system 102 monitors the space 100 for changes. In some implementations, the media system 102 monitors the location of each human and determines whether they are authorized users 108. The media system 102 can also monitor the space 100 for new humans, e.g., entrants in the space 100, instead of monitoring humans that have been identified as authorized users 108. Additionally, the media system 102 can identify humans outside of the space 100 that can be, or can soon be, in line of sight with the digital media.

In the example of FIG. 1, a non-authorized user 110 is about to walk in front of an open area in the space 100, e.g., an open door, a window. The current field of vision of the non-authorized user 110 is represented by the arc length sketched out by arrows 112. The sensors, e.g., sensors 120a, can identify a human approaching the open area. The media system 102 can determine whether the human has a beacon identified as corresponding to an authorized user, or can determine whether the human corresponds to images of an authorized user. In this example, the media system determines that the human does not correspond to an authorized user, and therefore the human is designated as a non-authorized user, e.g., non-authorized user 110.

The media system 102 can then determine that the non-authorized user 110 can view the digital media on the presentation device 104. For instance, the media system 102 can determine whether the non-authorized user's 110 gaze encompasses the presentation device 104, or whether the non-authorized user's 110 body is about to turn to face the presentation device 104, e.g., using skeletal reconstruction modeling. Since the non-authorized user's 110 field of view 112 does not encompass the presentation device 104, and is not soon going to encompass the presentation device 104, the media system 102 can determine that the probability of the user 110 viewing the presentation device 104 is below a threshold, e.g., 85%, 90%, 92%.

In some implementations the media system 102 can obtain information identifying a location of the presentation device 104, e.g., from information identifying a floor plan of the space and a location in the floor plan of the presentation device 104. In some implementations the media system 102 can identify a location of the presentation device 104 using sensor data, e.g., from images of the presentation device 104 obtained from sensor data. Additionally, the presenting user 106 can identify the location of the presenting device 104 to the media system, e.g., by selecting a location on a digital representation of the floor plan of the space.

The media system 102 can then determine whether a non-authorized user 110 is about to view the presentation device 104 from information identifying the location of the presentation device 104. Additionally, in some implementations the presentation device 104 can include sensors to obtain images of users, e.g., non-authorized users, that are currently viewing the presentation device 104, e.g., users that are in line of sight with the presentation device 104.

While reference is made to one presentation device 104, it should be understood that the media system 102 can provide the digital media for presentation on multiple presentation devices, and determine whether non-authorized users are viewing, or are about to view, any of the presentation devices.

In the illustrated example of FIG. 1, if the non-authorized user 110 continues to move forward, the media system 102 can determine that the non-authorized user 110 is about to have the presented digital media within their field of view. After this determination, the media system 102 can stop providing the digital media for presentation, and resume providing the digital media when the non-authorized user's 110 field of view 112 no longer encompasses the digital media.

In some implementations, the sensors, e.g., sensors 120 b or sensors 120 c, can have audio sensors to capture audio identifying that the non-authorized user 110 is close to the opening of the space 100. The media system 102 can determine that a human is outside of the space 100, and obtain sensor information, e.g., from sensors 120a, to identify whether the human is an authorized user. If the media system 102 cannot obtain images of the non-authorized user 110, the media system 102 can stop providing the digital media for presentation as a precautionary measure.

In some implementations, the media system 102 can obtain sensor data from sensors located outside of the space 100, e.g., within a specified distance of the space 100. In this way the media system can identify humans in the space 100, or outside of the space 100.

As will be described more fully below, the media system 102 can also identify that a non-authorized user is attempting to view the digital media through a reflection, e.g., a specular surface such as a mirror. The media system 102 can obtain sensor data and identify specularity components in the space 100. The media system 102 can then identify whether a non-authorized user is looking at the specularity component to attempt to view the digital media.

Figure 2:
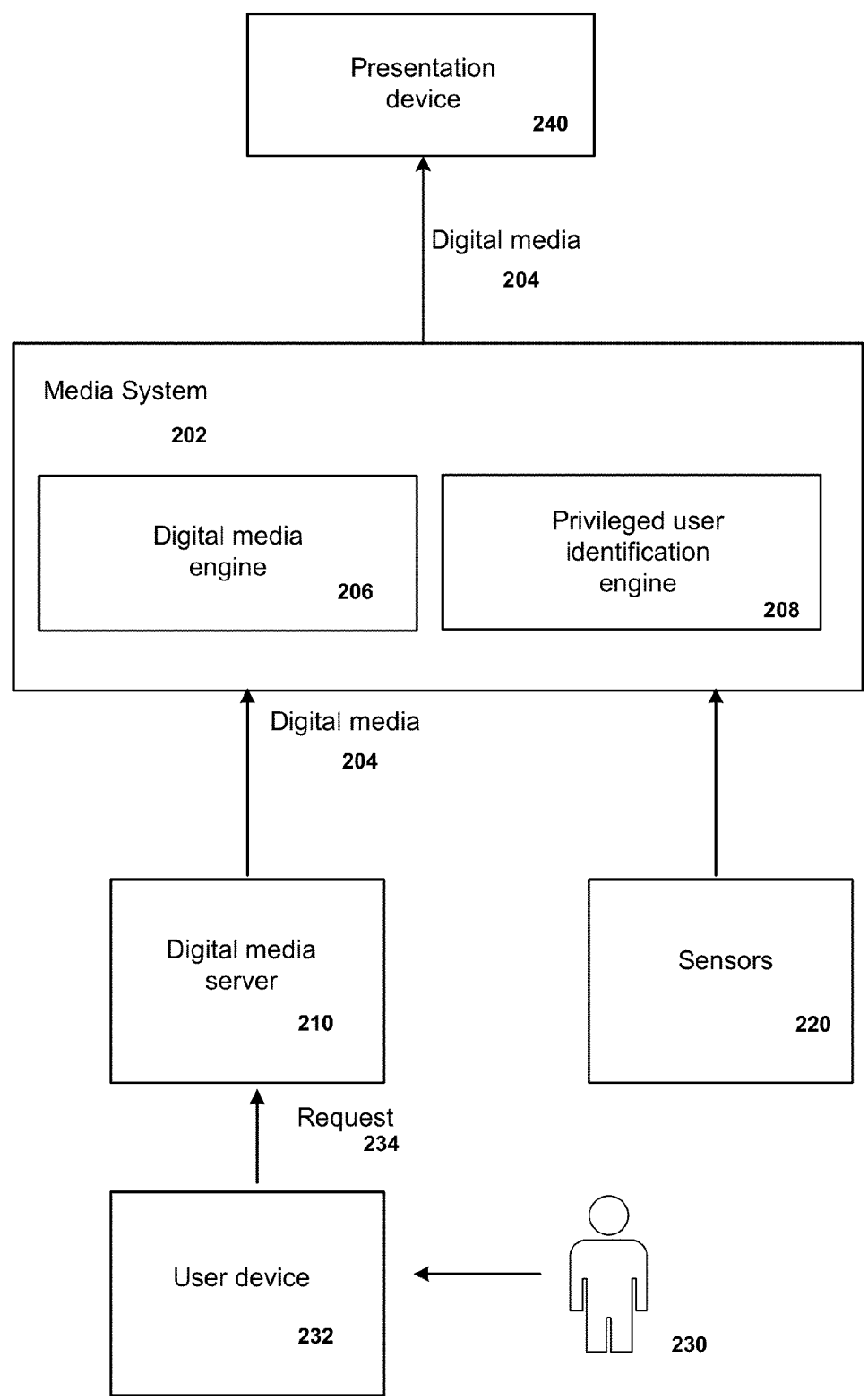
FIG. 2 illustrates an example media system used for the presentation of digital media.

FIG. 2 illustrates an example media system 202 used for the presentation of digital media 204. The media system 202 can be a system of one or more computers, and can be the media system 102 described above in FIG. 1. The media system 202 is in communication with sensors 220 placed in one or more spaces, and further in communication with a digital media server 210, e.g., a system of one or more computers. The digital media server 210 can communicate with the media system 202 over a network, e.g., the Internet, or the media system 202 can be software executing on the digital media server 210.

A presenting user 230 can access a user device 232, e.g., a laptop, a computer, a tablet, a wearable device, to generate a request 234 to provide digital media 204 to authorized users. The request 234 specifies the digital media 204 to be provided, and one or more authorized users that can view the digital media 204. Additionally the request 234 can identify one or more spaces where the digital media 204 is to be provided, one or more times that the digital media 204 is to be provided, and one or more presentation devices 240 in the one or more spaces.

In some implementations, the request 234 can be a calendar event generated by the user 230 on the user device 232. For instance, the user 230 can specify one or more contacts, e.g., e-mail contacts, social network contacts, specific e-mail addresses, the digital media 204 to be presented, a particular time, and one or more spaces, e.g., rooms in buildings. The calendar event can then be provided to the media system 202 as the request 234.

In some implementations, to specify digital media 204 the user device 232 can receive a resource, e.g., web page, from the digital media server 210 that includes a list of stored digital media associated with the user 230. The user 230 can select digital media 204 to be provided for presentation, and also input identifiers of authorized users, e.g., from a contacts list, a particular time, and one or more spaces. The digital media server 210 can then provide the received information to the media system 202 as the request 234.

After the media system 202 receives the request 234, the media system 202 obtains the digital media 204, e.g., from the digital media server 210 or from the user device 232 as an upload. Additionally the media system 202 obtains information describing the authorized users, as described above in FIG. 1.

The media system 202 includes a digital media engine 206 that provides the digital media 204 to presentation devices 240 in the spaces identified in the request 234. The digital media engine 206 provides the digital media 204 until receiving information from an authorized user identification engine 208 that a non-authorized user is viewing, or is about to view, the digital media 204.

The authorized user identification engine 208 obtains sensor data from sensors 220 included in the spaces, identifies humans from the sensor data, and determines whether non-authorized users are capable of viewing, or are about to view, the digital media 204. If the authorized user identification engine 208 determines that non-authorized users are viewing, or are about to view, the digital media 204, the engine 208 provides information to the digital media engine 206 to stop providing the digital media 204 for presentation.

Figure 3:
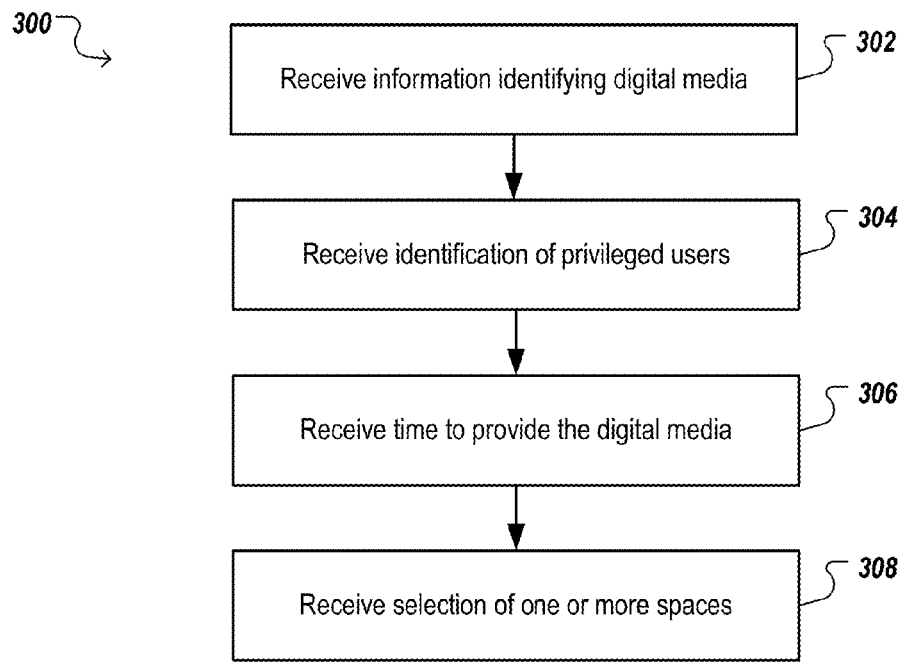
FIG. 3 is a flowchart of an example process for receiving a request to provide digital media for presentation.

FIG. 3 is a flowchart of an example process 300 for receiving a request to provide digital media for presentation. For convenience, the process 300 will be described as being performed by a system of one or more computers, e.g., the media system 202.

The system receives information identifying digital media to be provided for presentation (step 302). The system receives information from a user of a user device identifying digital media, e.g., a document, a presentation, a spreadsheet, a video clip, that is to be provided for presentation. In some implementations the user can upload the digital media to the system, e.g., over a network, or from a memory device.

In some implementations the user can access a resource, e.g., a web page, provided by a server system, e.g., the system, or an outside server system, using a user device. The resource can include a list of digital media associated with a user account that the user has with the system or an outside storage system, e.g., as cloud storage, and the user can select from among the listed digital media.

In some implementations the user can generate a calendar event, e.g., using software calendar executing on the user device, or using a web application associated with the system. The user can upload, e.g., attach, digital media to the calendar event, or the calendar event can be configured to allow the user to select from among a list of digital media associated with the user's user account.

After selection, the system can receive information identifying the selected digital media, e.g., a reference to a location of where the digital media is stored, or the digital media file itself. Additionally, the system can receive information identifying the selected digital media and identifiers of authorized users, described below in step 304, at the same time.

The system receives an identification of authorized users that are allowed to view the identified digital media (step 304).

To identify authorized users, the user can input user account names associated with the system, e.g., into the received resource or in the calendar event. In some implementations the user can enter names of individuals designated as authorized users, and the system can assign particular beacons to be worn by the authorized users. Assigning beacons is described below, with reference to FIG. 4.

Figure 4:
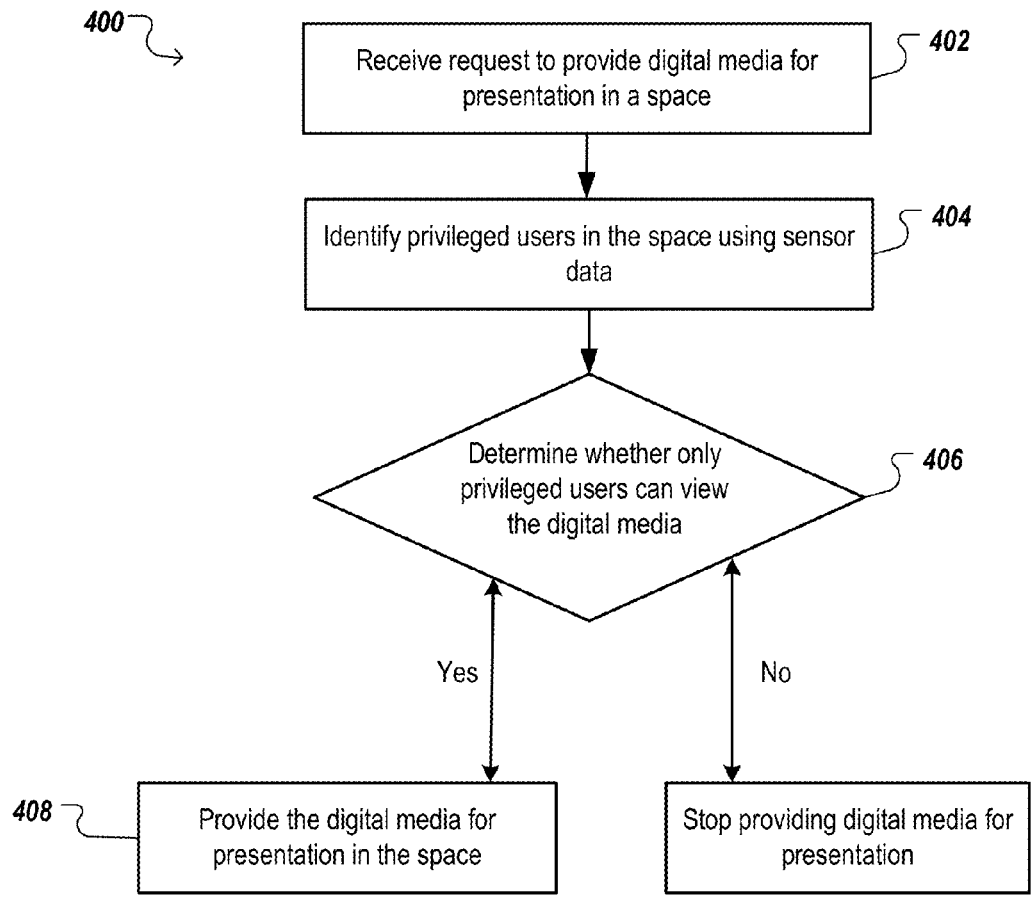
FIG. 4 is a flowchart of an example process for providing digital media for presentation.

In some implementations, the system does not receive an identification of the authorized users until the system identifies humans in the space, described in FIG. 4. In these implementations, the system determines authorized users as the humans that are located in the space when the digital media is to be provided. That is, the system obtains sensor data identifying the humans, and tracks the movements of the humans around the space. In this way the system does not need to receive an identification of authorized users, and can determine the authorized users at the time of presentation of the digital media.

The system receives a time to provide the digital media (step 306). The user can specify a time that the system is to provide the digital media for presentation. The time can include a specific date, a specific time range, a specific starting time, and so on. The time represents the allowable time that the system will provide the digital media for presentation. Outside of the time, the system will stop providing the digital media.

The system receives a selection of one or more spaces that are to be provided the digital media for presentation (step 308). The system can provide a list of spaces, e.g., particular rooms, that are free at the user specified time. Additionally, the system can identify the type of sensors included in each space, which the user can view to inform a selection based on the level of privacy required by the presentation. For instance, a first space can include a plethora of sensors that can accurately identify each human in the space, humans near the space, or humans that might be attempting to view the digital media from afar, e.g., with a telescope watching through a window. A second space can include less sensors that can accurately identify only humans in the space or immediately outside of the space. The user can determine whether he/she wants to use the maximum privacy protected room, or whether a lesser protected room can suffice.

The system can identify presentation devices to provide the digital media from stored information describing the one or more spaces. In some implementations the system can determine locations of the presentation devices from stored information, e.g., floor plans with locations of presentation devices. In some implementations the system can determine locations of the presentation devices by providing the digital media to the presentation device and obtaining sensor data identifying locations where the digital media is being presented.

After receiving information identified in steps 302-308, the system can process the information as a request to provide the digital media, described below in FIG. 4.

FIG. 4 is a flowchart of an example process 400 for providing digital media for presentation. For convenience, the process 400 will be described as being performed by a system of one or more computers, e.g., the media system 202.

The system receives a request from a user to provide digital media for presentation in a space (step 402). The request can include an identification of the digital media, one or more authorized users, a time for the presentation, and an identification of the space. Receiving a request is described above, with reference to FIG. 3.

After receiving the request, the system obtains the digital media, e.g., from a digital media server, from storage maintained by the system, or from a user device as an upload included in the request. At the time specified in the request, the user can provide information to the system identifying that he/she wants to begin providing the digital media for presentation.

The system determines whether the present time satisfies the time specified in the request, and if so obtains sensor information from sensors in the space. As described above, the system can be a system of one or more computers that can communicate with sensors located in disparate spaces over a network. The request specifies a particular space to provide the digital media for presentation, so the system can obtain sensor information from only sensors included in the space. In some implementations, the system can maintain a database identifying sensors included in a space, e.g., groups of sensors identified by space.

The system further obtains information describing the authorized users. As described above, information describing an authorized user is information that allows the system to determine whether a human, as determined from sensor data, corresponds to an authorized user.

In some implementations the system can store images of users, e.g., face images, body images, or can store models of users, e.g., skeletal reconstructions of users, 3D face models, information describing the body shape of users, and so on. The system can then obtain images and models of the authorized users for use in determining whether a human in the space corresponds to an authorized user.

In some implementations the system can obtain identifiers of beacons to be worn by each authorized user. A beacon is a device that communicates a unique identifier over a wireless communications protocol, e.g., BLUETOOTH, near field communication, to sensors in the space. The system can access a database storing identifiers of users, e.g., user account names, real names of users, mapped to identifiers of respective beacons provided to the users. The system can then obtain the identifiers of beacons mapped to the authorized users. In another example the system can generate an assignment of identifiers of beacons to respective authorized users, and the authorized users can wear the designated beacons. In this way the system can anonymize the authorized users, e.g., the system only knows the identifiers but not the specific authorized users wearing them.

In some implementations the system can obtain sensor data describing the space, and identify humans present in the space as being the authorized users. The system can store information describing each identified human, e.g., images or models of the human.

The system identifies authorized users in the space and non-authorized users in, or outside, the space (step 404). After obtaining information describing each authorized user, the system obtains sensor data from sensors positioned in, or near, the space and identifies humans in the space, or within line of sight of the space, e.g., located outside of the space.

To identify humans, the system can obtain images, e.g., from video cameras, and perform a process to recognize humans. In some implementations the system can obtain thermal information, e.g., infra-red spectra information, and identify the outlines of a human by the heat patterns that are given off by a human. For instance, the system can have stored models that can be compared against the images to identify humans. Additionally the system can identify humans from visible spectrum images by performing a pattern matching process to identify the outlines of a human form. This process can involve classifying portions of the obtained images using machine learning models by comparing the portions to a space of human shapes. The system can identify outlines of humans, project the human outline into the space, and identify whether the portions are of a human form.

The system can also identify humans based off specific features shared by all humans, e.g., a torso, a head, and so on. Since the human might not be facing any of the sensors included in the space, the system can still identify the humans by identifying multiple human features in the obtained images.

In some implementations the system can identify any kinetic structure, e.g., a moving object composed of multiple moving parts, that identifies an animal as a human. For instance, the system can identify a dog as a moving kinetic object, and characterize the dog as a human. In this way the system can assume that any moving animal might have a camera attached to it, e.g., a camera on a dog, that can potentially view the digital media.

Wherever reference is made to obtaining information from sensors, e.g., images of humans, or other sensor data, the system can delete the obtained information after the presentation is complete.

Additionally the system can utilize audio sensors to identify footsteps, or breathing, outside of the space. In this way, if there are not visual sensors located outside of the space, the system can still identify humans through audio cues.

After identifying each human, the system determines whether they are authorized users.

In implementations where the system has access to images or models of each authorized user, the system can perform a facial recognition process to identify humans that correspond to authorized users. The system can apply stored machine learning models trained on images and models of each authorized user to humans identified in the space.

Additionally, the system can anonymize images or models of authorized users by only storing images and models mapped to anonymous identifiers, e.g., numerical values. When the system receives a request identifying the authorized users, the system can receive the anonymous identifiers, and obtain images or models mapped to the anonymous identifiers.

In implementations where each user wears a beacon that broadcasts a unique identifier, the system can triangulate locations of each beacon that corresponds to an authorized user. That is, the sensors can be positioned around the room to allow for the system to receive the broadcast and determine coordinates of the beacon within the space. To effect this determination, the system can receive the relative power level as seen by each sensor, and triangulate the location in the space. The system can obtain information describing the space, e.g., a floor plan, to accurately place each beacon within the space. Alternatively, the system can map the space using sensor data, e.g., obtain images of the space using depth cameras and stick the images together to create a representation of the space. The system can then identify locations of each identified human in the space, e.g., from depth images of the human as obtained by disparate sensors in the space, and compare whether the human is at the same location as a beacon corresponding to an authorized user.

The system determines that only authorized users can view the digital media (step 406). After identifying the authorized users in the space, the system determines whether any remaining, e.g., non-authorized users, are viewing, or are about to view, the digital media.

To effect this determination, the system identifies a gaze, e.g., field of view, of each non-authorized user. The system can identify the eyes of each non-authorized user, e.g., using infra-red or ultraviolet cameras, and perform an eye tracking process. The eye tracking process can identify a field of view of a non-authorized user, e.g., by determining vectors identifying lines of sight emanating from the eyes. The system can then determine whether the non-authorized user has a line of sight with the digital media, e.g., provided on one or more presentation devices. Images obtained from sensors, e.g., depth sensors, that depict the space can be utilized to determine whether the non-authorized user has a line of sight with the digital media. If the system determines that a non-authorized user has a line of sight with the digital media, it stops providing the media for presentation.

The system can also obtain image frames of video from sensors and generate kinematic representations of each non-authorized user, e.g., performing a skeletal reconstruction process. A skeletal reconstruction is a model that can illustrate the movement of the body parts of a human. The system can map each non-authorized user onto a skeletal reconstruction model, e.g., by mapping successive image frames onto the model to determine movement. In this way the system can determine a direction of movement of each non-authorized user, and also a rotation of each non-authorized user. For instance, the system can determine when a non-authorized user is about to turn around and face the digital media, e.g., in line of sight with the digital media. If the system determines that a non-authorized user is about to be in line of sight with the digital media, it stops providing the media for presentation.

Additionally, the system can map the movement of body parts of a human by mapping each body part to a skeletal frame, e.g., a wire frame. The system can identify points on the body part of the human to track, and map the location of those points to the skeletal frame.

Additionally, the system can identify specular components, e.g., reflections, in the space, e.g., using images obtained from sensors, and determine whether a non-authorized user is attempting to view the digital media through the specular component. The system generates kinematic models of each non-authorized user, and determines a potential gaze of the non-authorized users. The system then performs a process to determine if the non-authorized user can view the digital media through an identified specular component. In some implementations the system performs a series of vector bounces from the eyes of the non-authorized user to the specular component, e.g., light bounces, and determines whether any vectors bounce from the specular component to the digital media. The result of the vector bounces can be a probability that the vector bounces to the digital media. The system can determine that a non-authorized user is viewing the digital media if the probability passes a threshold, e.g., 85%, 90%, 93%. Additionally, the system can identify cameras in the space, e.g., from stored images of cameras on user devices, images of cameras, or identifying specular components and assuming that they might be a lens of a camera, and stop providing the digital media for presentation upon a positive identification.

In some implementations the system can determine, from kinematics of a non-authorized user, that the non-authorized user is about to be in a range, e.g., distance, of viewing the digital media. For instance, the system can identify a non-authorized user down a hallway in line of sight with the digital media. The system can determine the distance from the digital media to the non-authorized user by obtaining ultrasonic sensor data. Additionally the system can use stereo sensors, e.g., cameras, to determine an estimation of distance. If the system determines that the user is moving towards the digital media, and that the non-authorized user passes a threshold distance from the digital media, e.g., determined from the dimensions of the presentation of the digital media and average human visual resolving ability, the system can stop providing the digital media for presentation.

The system provides the digital media for presentation while determining that only authorized users are viewing the digital media (step 408). The system receives sensor data on a continuous basis, e.g., at a high refresh rate, and performs the steps 404-406. The system provides the digital media for presentation in the space while only authorized users can view it.

Additionally, in some implementations the request provided from the presenting user can identify that authorized users can view the digital media on personal user devices, e.g., laptops, tablets, and so on. In these implementations the system can determine whether non-authorized users can view the displays attached to the user devices. For instance, the system can obtain images from cameras included in the user devices, and determine whether non-authorized users are visible in the images.

As described above, if the system determines that a non-authorized user is viewing, or is about to view, the digital media, it stops providing the digital media for presentation, e.g., in one or more spaces and one or more presentation devices included in the one or more spaces. In some implementations the system can provide an overlay of the digital media for presentation, e.g., an image or video overlaid on top of the digital media.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
  receiving a request from a first user to provide digital media for presentation on two or more presentation devices in a first physical space, the request identifying the digital media and a group of authorized users allowed to view the digital media;

identifying, from a plurality of sensors in the first physical space, one or more of the authorized users located in the first physical space;

determining, from the plurality of sensors in the first physical space, that only authorized users can view the digital media;

while determining that only authorized users can view the digital media, providing the digital media for presentation on the two or more presentation devices for the one or more authorized users located in the first physical space;

using one or more sensors of the plurality of sensors to monitor the first physical space to identify a non-authorized user;

calculating a probability for each of the two or more presentation devices that the presentation device is likely to be in the field of view of the non-authorized user; and stopping presentation of the digital media on respective presentation devices of the two or more presentation devices presenting the digital media to the group of authorized users when the calculated probability exceeds a threshold value.

2. The method of claim 1, wherein determining that only authorized users can view the digital media comprises determining that a probability that only authorized users can view the digital media is greater than a threshold value.

3. The method of claim 1, wherein determining that a non-authorized user can view the digital media comprises:

identifying, from the plurality of sensors, the non-authorized user; and determining, from the plurality of sensors, that a gaze of the non-authorized user is in the line of sight with the digital media provided for presentation.

4. The method of claim 3, further comprising:

determining, from the plurality of sensors, that the non-authorized user is within a particular number of feet from the digital media provided for presentation, wherein the particular number of feet is determined from dimensions of the digital media provided for presentation.

5. The method of claim 1, wherein calculating the probability that a particular presentation device is likely to be in the field of view of the non-authorized user comprises:

determining that the non-authorized user is turning to be in line of sight with the digital media provided for presentation.

6. The method of claim 5, wherein determining that the non-authorized user is turning comprises:

obtaining, using the plurality of sensors, a skeletal reconstruction of the non-authorized user; and determining, from the skeleton reconstruction, that the non-authorized user is turning to be in line of sight with the digital media provided for presentation.

7. The method of claim 1, wherein identifying an authorized user comprises:

obtaining one or more images of the authorized user identified by the request;

obtaining information from the plurality of sensors describing one or more humans in the first physical space; and determining, from the one or more images, that the authorized user is a human of the one or more humans.

8. The method of claim 1, wherein the request specifies identifiers of beacons to be worn by the authorized users, and wherein identifying an authorized user comprises:

obtaining information from the plurality of sensors describing one or more identifiers of respective beacons worn by respective humans in the first physical space;

identifying, from the information, an identifier of a beacon to be worn by the authorized user that is worn by a human in the first physical space; and designating the human as the authorized user.

9. The method of claim 1, wherein the plurality of sensors comprise one or more of thermal sensors, cameras, wireless communication sensors, and/or ultrasonic sensors.

10. The method of claim 1, wherein the request further identifies a second physical space for the presentation of the digital media.

11. The method of claim 1, wherein the request identifies two or more presentation devices in the first physical space that are to present the digital media.

12. A system comprising:

one or more computers and one or more storage devices storing instructions that are operable, when executed by the one or more computers, to cause the one or more computers to perform operations comprising:

receiving a request from a first user to provide digital media for presentation on two or more presentation devices in a first physical space, the request identifying the digital media and a group of authorized users allowed to view the digital media;

identifying, from a plurality of sensors in the first physical space, one or more of the authorized users located in the first physical space;

determining, from the plurality of sensors in the first physical space, that only authorized users can view the digital media;

while determining that only authorized users can view the digital media, providing the digital media for presentation on the two or more presentation devices for the one or more authorized users located in the first physical space;

using one or more sensors of the plurality of sensors to monitor the first physical space to identify a non-authorized user;

calculating a probability for each of the two or more presentation devices that the presentation device is likely to be in the field of view of the non-authorized user; and stopping presentation of the digital media on respective presentation devices of the two or more presentation devices presenting the digital media to the group of authorized users when the calculated probability exceeds a threshold value.

13. The system of claim 12, wherein determining that a non-authorized user can view the digital media comprises:

identifying, from the plurality of sensors, the non-authorized user; and determining, from the plurality of sensors, that a gaze of the non-authorized user is in the line of sight with the digital media provided for presentation.

14. The system of claim 12, wherein calculating the probability that a particular presentation device is likely to be in the field of view of the comprises:

determining that the non-authorized user is turning to be in line of sight with the digital media provided for presentation.

15. The system of claim 12, wherein identifying an authorized user comprises:

obtaining one or more images of the authorized user identified by the request;

obtaining information from the plurality of sensors describing one or more humans in the first physical space; and determining, from the one or more images, that the authorized user is a human of the one or more humans.

16. The system of claim 12, wherein the request specifies identifiers of beacons to be worn by the authorized users, and wherein identifying an authorized user comprises:

obtaining information from the plurality of sensors describing one or more identifiers of respective beacons worn by respective humans in the first physical space;

identifying, from the information, an identifier of a beacon to be worn by the authorized user that is worn by a human in the first physical space; and designating the human as the authorized user.

17. A computer program product, encoded on one or more non-transitory computer storage media, comprising instructions that when executed by one or more computers cause the one or more computers to perform operations comprising:

receiving a request from a first user to provide digital media for presentation on two or more presentation devices in a first physical space, the request identifying the digital media and a group of authorized users allowed to view the digital media;

identifying, from a plurality of sensors in the first physical space, one or more of the authorized users located in the first physical space;

determining, from the plurality of sensors in the first physical space, that only authorized users can view the digital media;

while determining that only authorized users can view the digital media, providing the digital media for presentation on the two or more presentation devices for the one or more authorized users located in the first physical space;

using one or more sensors of the plurality of sensors to monitor the first physical space to identify a non-authorized user;

calculating a probability for each of the two or more presentation devices that the presentation device is likely to be in the field of view of the non-authorized user; and stopping presentation of the digital media on respective presentation devices of the two or more presentation deices presenting the digital media to the group of authorized users when the calculated probability exceeds a threshold value.

* * * * *